US010075961B2

(12) United States Patent
Nekovee

(10) Patent No.: US 10,075,961 B2
(45) Date of Patent: Sep. 11, 2018

(54) CHANNEL SELECTION IN A WIRELESS NETWORK

(71) Applicant: BRITISH TELECOMMUNICATIONS public limited company, London (GB)

(72) Inventor: Maziar Nekovee, London (GB)

(73) Assignee: British Telecommunications Public Limited Company, London (GB)

( * ) Notice: Subject to any disclaimer, the term of this patent is extended or adjusted under 35 U.S.C. 154(b) by 164 days.

(21) Appl. No.: 14/780,354

(22) PCT Filed: Mar. 25, 2014

(86) PCT No.: PCT/GB2014/000111
§ 371 (c)(1),
(2) Date: Sep. 25, 2015

(87) PCT Pub. No.: WO2014/155037
PCT Pub. Date: Oct. 2, 2014

(65) Prior Publication Data
US 2016/0044685 A1     Feb. 11, 2016

(30) Foreign Application Priority Data
Mar. 25, 2013   (EP) .................................... 13250034

(51) Int. Cl.
*H04L 12/28* (2006.01)
*H04W 72/08* (2009.01)
(Continued)

(52) U.S. Cl.
CPC ......... *H04W 72/082* (2013.01); *H04W 16/14* (2013.01); *H04W 72/0453* (2013.01)

(58) Field of Classification Search
CPC ............................................... H04W 72/0406
(Continued)

(56) References Cited

U.S. PATENT DOCUMENTS

| 8,649,418 B1 * | 2/2014 | Negus ................. H04B 7/0486 375/211 |
| 2008/0159207 A1 | 7/2008 | Levine et al. |

(Continued)

FOREIGN PATENT DOCUMENTS

| EP | 1 096 730 A1 | 5/2001 |
| WO | WO 2009/142196 A2 | 11/2009 |

OTHER PUBLICATIONS

PCT International Search Report for International Application No. PCT/GB2014/000111, dated Jun. 6, 2014, 3 pages.
(Continued)

*Primary Examiner* — Dang Ton
(74) *Attorney, Agent, or Firm* — Amy M. Salmela; Patterson Thuente Pedersen, P.A.

(57) ABSTRACT

An adaptive channel selection method is disclosed, performed by an autonomous communications node for selecting one of a plurality of possible channels in an unlicensed spectrum band. The method comprises: (a) for each channel: (i) determining a first interference measure $U_i^S$ for the channel based on received energy from one or more other nodes j using said channel; (ii) causing the or each other node j using said channel to transmit an echo signal and receiving the echo signal(s) at the first communications node; (iii) determining from the or each echo signal a second interference measure $U_i^A$; (iv) determining a third interference measure $U_i$ based on a combination of the first and second interference measures; and (b) selecting a channel whose third interference measure meets a predetermined condition.

16 Claims, 7 Drawing Sheets

(51) Int. Cl.
*H04W 16/14* (2009.01)
*H04W 72/04* (2009.01)

(58) Field of Classification Search
USPC .......................................................... 370/329
See application file for complete search history.

(56) References Cited

U.S. PATENT DOCUMENTS

2010/0255794 A1    10/2010  Agnew
2012/0252510 A1    10/2012  Wang et al.

OTHER PUBLICATIONS

Leith D J et al: "A Self-Managed Distributed Channel Selection Algorithm for WLANs", Modeling and Optimization in Mobile, Ad Hoc and Wireless Networks, 200 6 4th International Symposium on Boston, MA, USA Apr. 3-6, 2006, Piscataway, NJ, USA, IEEE, Apr. 3, 2006 (Apr. 3, 2006), pp. 1-9, XP010933071, DOI: 10.1109/WIOPT.2006.1666484 ISBN: 978-0-7803-9549-7 cited in the application abstract paragraph [0iii] paragraph [000v].

* cited by examiner

CHANNEL SELECTION IN A WIRELESS NETWORK

RELATED APPLICATIONS

The present application is a National Phase entry of PCT Application No. PCT/GB2014/000111, filed Mar. 25, 2014, which claims the benefit of EP Application No. 13250034.9, filed Mar. 25, 2013, each of which is incorporated herein by reference in its entirety.

TECHNICAL FIELD

Embodiments relate to a method and system of channel selection in a wireless network, particularly, though not exclusively, an adaptive channel selection method for nodes operating in a heterogeneous network.

BACKGROUND

A number of countries have committed to allow cognitive radio (CR) access to unlicensed spectrum, or what is commonly referred to as Television White Space (TVWS). This is to be performed under the authorization of geolocation databases, although how multiple TVWS devices (WSD) should share the available TVWS channels once they are granted is currently neither regulated nor standardized. One possible solution is to allow geolocation databases to co-ordinate the sharing of TVWS among potentially interfering devices based on location information. However, in some territories such as the USA, the regulator has permitted multiple geolocation database providers to exist in order to promote competition. This is a trend that is likely to be followed elsewhere.

A database-centric approach to TVWS sharing may not, therefore, be feasible or efficient as it will require frequent communications between the different database providers in order to share information on TVWS usage by WSDs, which of course will change frequently.

The IEEE 802.19 standard is attempting to address this issue by introducing a centralized spectrum management entity to which WSDs would voluntarily subscribe. This however is likely to suffer from scalability issues due to proliferation of TVWS networks. Furthermore, it is not clear how, without regulatory intervention, WSDs using different access technologies from the IEEE 802 families (such as LTE) would voluntarily subscribe to such a management entity.

Autonomous spectrum sharing protocols (or spectrum etiquettes or politeness protocols) are known whereby devices autonomously regulate the sharing of spectrum amongst themselves. One example is adaptive channel selection algorithms used in IEEE 802.11 (WiFi) access points which operate in the Industrial Scientific and Medical (ISM) bands. These protocols distribute available frequency channels amongst themselves to minimize interference. CSMA-CA is then used to enable time-sharing between potentially interfering devices operating in the same channel.

Further information on such a conventional protocol is described in "A self-managed distributed channel selection for WLANs" by D. J. Leith, P. Clifford, 4th IEEE International Symposium on Modelling and Optimization in Mobile, Adhoc and Wireless Networks, pages 1-9, 2006.

Devices operating according to these protocols in the ISM band generally operate at low transmit powers (up to 100 mW in the UK and Europe and 1 W in the United States) and use the same air-interface standard. WSDs, on the other hand, will likely use different transmit powers. For example, devices using the emerging IEEE 802.11af standard will typically use 100 mW (EIRP) or lower, whilst devices using the IEEE 802.22 standard (or LTE or WiMAX) for rural broadband access may use up to 4 W (EIRP). Furthermore, low power devices generally use omnidirectional antennas whereas high power devices tend to use directional antennas. Referring to FIG. 1, modelling of the conventional WiFi adaptive channel selection algorithms suggests that, as more high power devices enter a wireless network, the average interference actually increases. Even introducing a small number of high power devices has a detrimental effect. The same problem is found to occur if, instead of using different transmit powers, some WSDs use directional antennas whilst others use omnidirectional antennas.

The reason for this effect is likely due to the asymmetrical nature of interference between low and high power devices (or devices having directional and omnidirectional antennas).

Furthermore, WSDs will likely use different air interface standards (WiFi, LTE, MiMAX, Weighless). Conventional WiFi adaptive channel selection and CSMA-CA methods were not developed to operate in the heterogeneous network scenarios envisaged for TVWS.

SUMMARY

A first aspect of embodiments provides a method of channel selection in a wireless network, the method being performed at a first communications node i and comprising: (a) identifying a plurality of communications channels $q_n$, and, for each channel: (i) determining a first interference measure $U_i^S$ for the channel based on received energy or power from one or more other nodes j using said channel; (ii) causing the or each other node j using said channel to transmit an echo signal and receiving the echo signal(s) at the first communications node; (iii) determining from the or each echo signal a second interference measure $U_i^A$; (iv) determining a third interference measure $U_i$ based on a combination of the first and second interference measures; and (b) selecting a channel whose third interference measure meets a predetermined condition.

The method provides for co-operative channel selection in which the interference that will be experienced by the node i in joining a particular channel is combined with a measure of the interference that other nodes j will experience if node i joins that channel. This combined result is used as a basis for identifying which of the possible channels is to be selected, and, overall, reduces the likelihood of interference compared with conventional methods. It also obviates the need to have channels allocated by an external system, such as a centralized database or regulatory authority.

The selecting at (b) comprises selecting the channel whose third interference measure $U_i$ is the lowest, in an embodiment.

The determining at (a)(iv) may comprise determining $U_i$ using the weighted sum of the first and second interference measures $U_i^S$, $U_i^A$. The determining at (a)(iv) may comprise determining $U_i$ using: $\alpha U_i^S + (1-\alpha) U_i^A$ where $\alpha$ is a weighting factor. Applicant has identified that system interference monotonically decreases to a minimum when $\alpha$ is set to, or is approximately, 0.5.

The determining at (a)(i) may comprise determining $U_i^S$ by measuring the energy or power received in the channel from the or each other node j. Mathematically, this can be expressed as:

$$U_i^S(q_i) = \sum_{j \neq i}^{N} P_j G_{ij}$$

where $P_j$ is the transmit power of the other node, $G_{ij}$ is the channel gain between node j and i, and N is the number of other nodes using said channel, $q_i$ The causing at (a)(ii) may comprise transmitting from the node i a pulse of power $P_i$ effective to cause the or each other node using said channel to issue an echo pulse of power $P_j$ in reply, and the determining at (a)(iii) comprises determining using a characteristic of the or each of the received echo pulse(s) the second interference measure $U_i^A$.

Where plural echo pulses are received in reply, step (a)(iii) may comprise determining $U_i^A$ using a summation of the characteristic of each received echo pulse.

The determining at (a)(iii) may comprise estimating the power $P_j$ of the or each received echo pulse and using said characteristic to calculate the second interference measure $U_i^A$.

The determining at (a)(iii) may comprise estimating the modulation frequency $\omega_j$ of the or each received echo pulse and using said estimate to estimate the or each $P_j$.

The determining at (a)(iii) may comprise calculating a discount factor $\alpha_{ij}$ for the or each received echo pulse, where $\alpha_{ij}$ is the ratio of $P_j$ to $P_i$, and determining the second interference measure $U_i^A$ using:

$$\sum_{j \neq i}^{N} \alpha_{ij}^{-1} E_j$$

where $E_j$ is an energy component of the or each received echo pulse. $E_j$ may be the energy component corresponding to $\omega_j$.

The method may further comprise (c) receiving an echo request signal from another node; and (d) responsive to said receipt, transmitting back to the other node an echo signal. The transmitting at (d) may further comprise estimating the power of the echo request signal from the other node and generating an echo signal in reply having a characteristic that is dependent on said estimated power of the echo request signal. The transmitting at (d) may further comprise estimating the power of the echo request signal by estimating an increase in Bit Error Rate (BER) caused by receiving the echo request signal, and using the increase in BER to estimate the power of the echo request signal. The increase in BER may be used to compute an estimate of the amplitude of the echo request signal from which is derived the estimated power of the echo request signal.

If the estimated power of the echo request signal is less than that that can be issued by the node for the echo signal for the channel bandwidth, then the echo signal may be transmitted back at substantially the same power of the echo request signal by means of using a narrower bandwidth. The narrower bandwidth may be determined by reducing the channel bandwidth by a factor substantially equal to the ratio of the power that can be issued by the node for the channel bandwidth and the estimated power of the echo request signal.

A second aspect of embodiments provides a method for use in a wireless channel selection protocol, the method being performed at a communications node j and comprising: (a) receiving from another node i an echo request signal on a wireless channel being used by node j; (b) responsive to such receipt, issuing an echo signal for transmission to node i over said channel, characteristics of the echo signal being dependent on the echo request signal.

The issuing at (b) may comprise estimating the power $P_i$ of the echo request signal from node i and issuing an echo signal in reply that is dependent on said power.

The issuing at (b) may comprise estimating an increase in Bit Error Rate (BER) at node i caused by receiving the echo request signal, and using said estimate of BER increase to estimate $P_i$.

The estimated increase in BER may be used to compute an estimate of the amplitude of the echo request signal from which is derived $P_i$.

In (b), if the estimated power $P_i$ of the echo request signal is less than that that can be issued by node j for the echo signal for the channel bandwidth, the echo signal may be transmitted back using a narrower bandwidth than the channel bandwidth.

Any of the above method actions may be performed by a communications node as part of an autonomous channel selection protocol. The communications node may be a Television White Space (TVWS) node in which the method is employed as part of an autonomous TVWS channel selection protocol.

The method may further comprise updating a TVWS database storing channel allocation/usage data to reflect selection of a channel.

A third aspect of embodiments provides an adaptive channel selection method performed by an autonomous communications node i for selecting one of a plurality of possible channels in unlicensed spectrum space, the method comprising: (a) for each channel: (i) determining a first interference measure $U_i^S$ for the channel based on received energy from one or more other nodes j using said channel; (ii) causing the or each other node j using said channel to transmit an echo signal and receiving the echo signal(s) at the first communications node; (iii) determining from the or each echo signal a second interference measure $U_i^A$; (iv) determining a third interference measure $U_i$ based on a combination of the first and second interference measures; and (b) selecting a channel whose third interference measure meets a predetermined condition.

A fourth aspect of embodiments provides a computer program comprising instructions that when executed by a computer apparatus control it to perform the method of any preceding definition.

A fifth aspect of embodiments provides a non-transitory computer-readable storage medium having stored thereon computer-readable code, which, when executed by computing apparatus, causes the computer apparatus to perform the method according to any preceding definition.

A sixth aspect of embodiments provides a system comprising: means for identifying a plurality of communications channels $q_n$, and, for each channel, arranged to: (i) determine a first interference measure $U_i^S$ for the channel based on received energy or power from one or more other nodes j using said channel; (ii) cause the or each other node j using said channel to transmit an echo signal and receiving the echo signal(s) at the first communications node; (iii) determine from the or each echo signal a second interference measure $U_i^A$; (iv) determine a third interference measure $U_i$ based on a combination of the first and second interference measures; and means for selecting a channel whose third interference measure meets a predetermined condition.

BRIEF DESCRIPTION OF THE DRAWINGS

Embodiments will now be described, by way of non-limiting example, with reference to the accompanying drawings, in which.

DETAILED DESCRIPTION

Embodiments described provide methods and systems for selecting one of a plurality of channels for use in wireless communications, particularly, though not exclusively, for communications using unlicensed spectrum such as TVWS spectrum.

An adaptive channel selection method is described in the context of TVWS nodes, each of which is adapted to autonomously select a channel for wireless communications whilst minimizing interference notwithstanding that other nodes may be using the same channel. The general principle is to allow multiple TVWS nodes to communicate amongst themselves using the described steps such that channels are allocated without the need to contact a centralized platform or database handling such allocation.

Furthermore, the method can be performed at least in part on the physical layer and as such is applicable to heterogeneous network scenarios whereby communications nodes use different air-interfaces, such as WiFi, LTE, WiMAX, Weighless etc. Note that the methods described below relate simply to a channel selection algorithm and any existing or emerging communications standard or protocol may be used afterwards.

Figure 1:
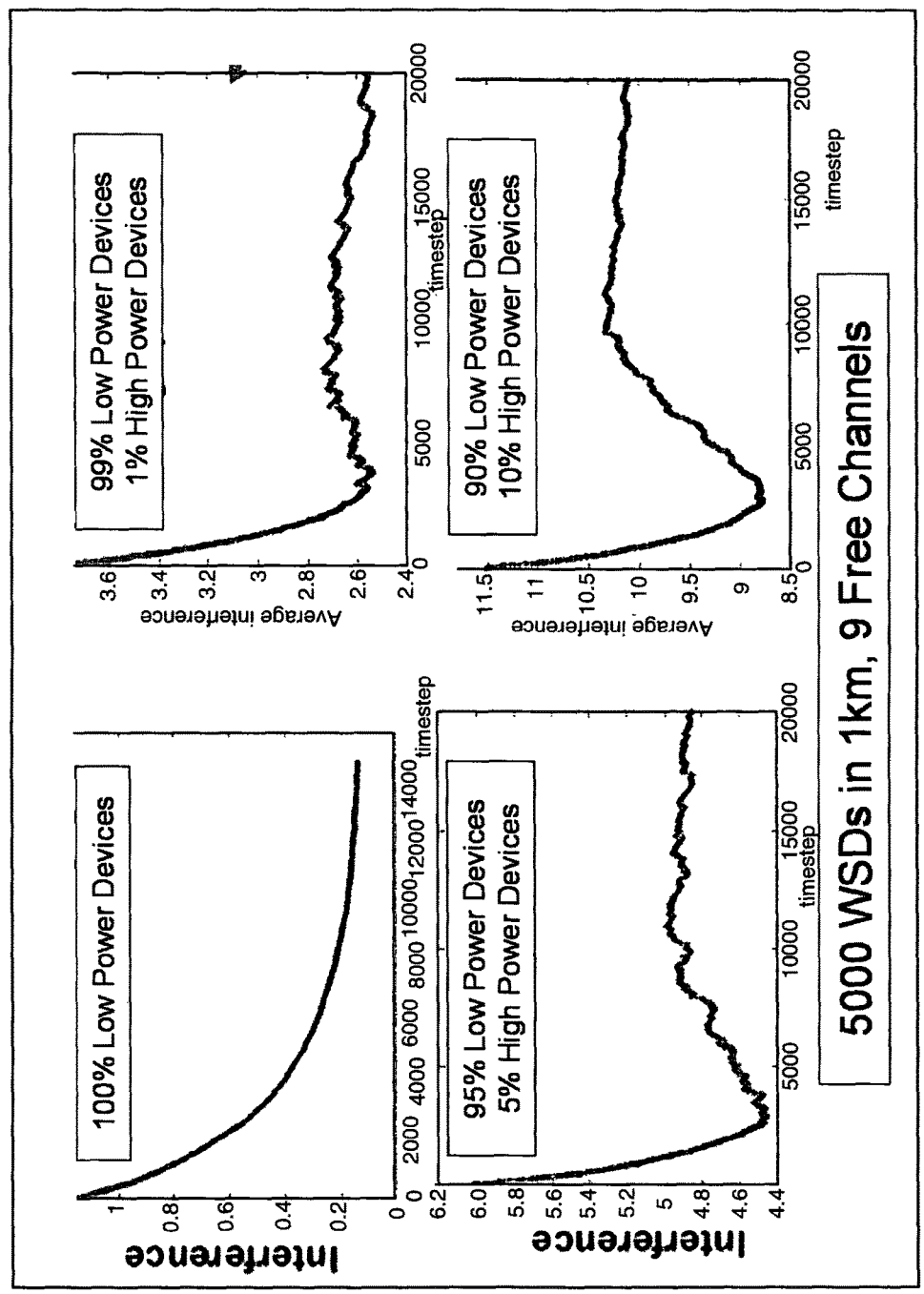
FIG. 1 is a series of graphs illustrating modelled interference results for a conventional adaptive channel selection method.
Figure 2:
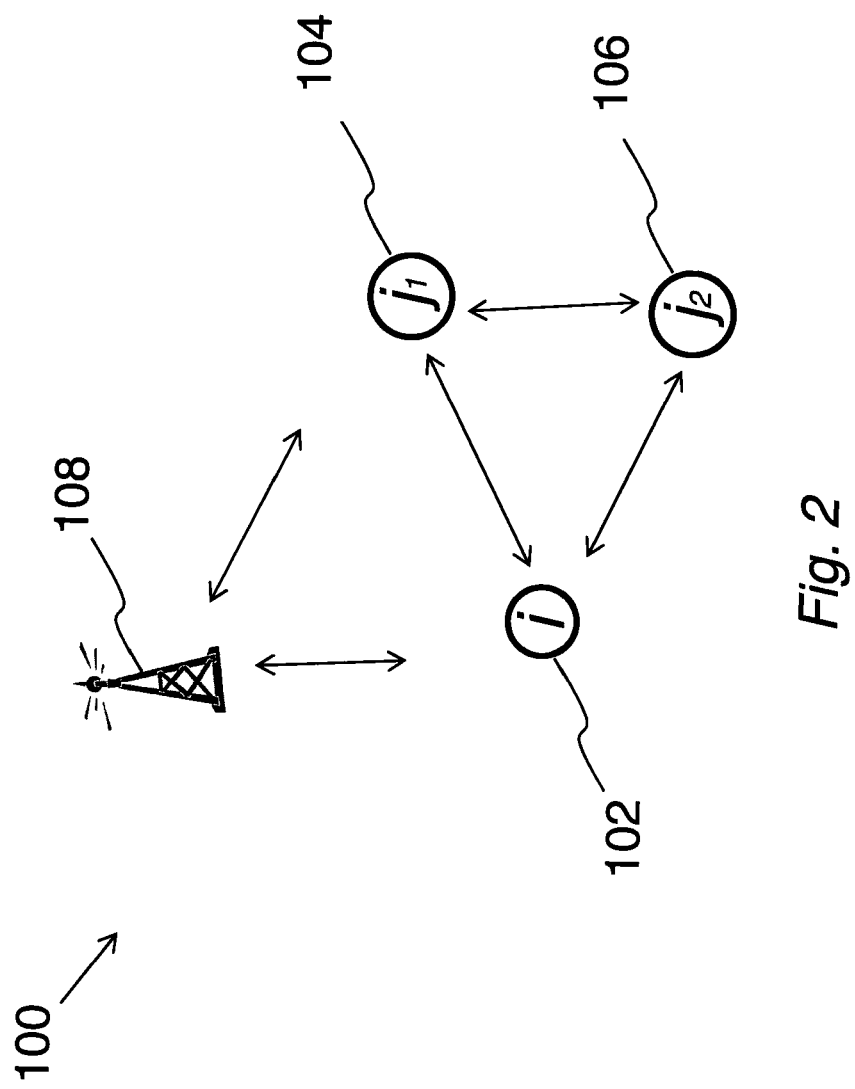
FIG. 2 is a schematic diagram of a simple TVWS network.

Referring to FIG. 2, a simple network scenario 100 is shown in which first, second and third White Space Devices (WSDs) 102, 104, 106 are shown in a localized area.

The WSDs 102, 104, 106 can be any type of electronic device having wireless communications functionality, including, but not limited to, mobile telephones, smartphones, Personal Digital Assistants (PDAs), laptop computers, desktop computers, tablet computers and so on. Alternatively, the WSDs could be fixed nodes, for example a WiFi router or mobile base station, instead of the mobile/personal type nodes used in the present embodiment. For the purposes of this embodiment, it is assumed that each WSD 102, 104, 106 is a smartphone having appropriate software, firmware and/or hardware for communicating bi-directionally over TVWS spectrum ("TVWS").

As shown in FIG. 2, the WSDs 102, 104, 106 may communicate directly amongst themselves using TVWS. Alternatively, or additionally, they may communicate indirectly using one or more TVWS access points 108, which likewise include the above-mentioned software, firmware and/or hardware. The TVWS access point 108 may also be configured to communicate with other TVWS access points (not shown) providing TVWS access between WSDs in different localities.

Figure 3:
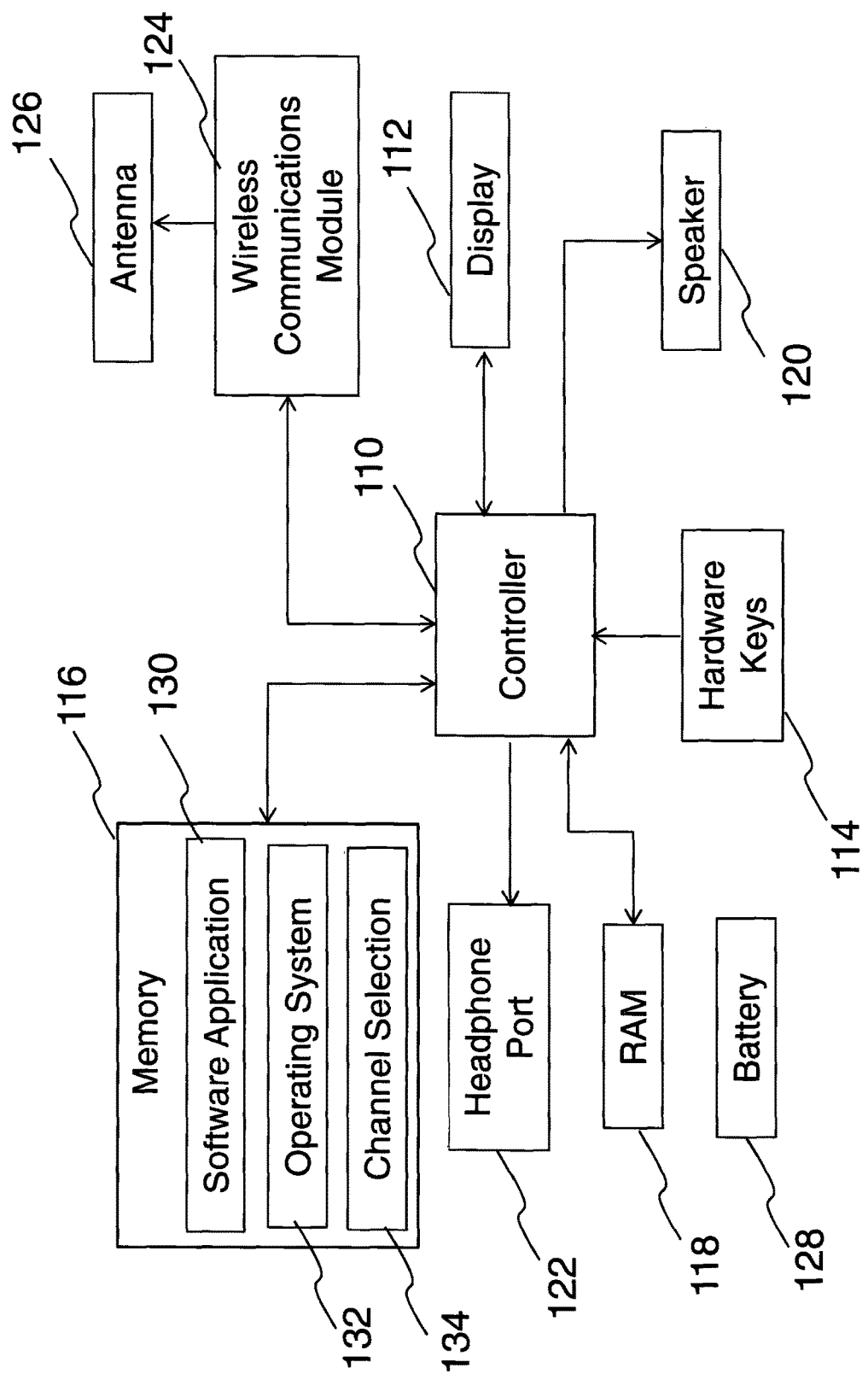
FIG. 3 is a schematic diagram of components of a TVWS node in accordance with an embodiment.

FIG. 3 is a schematic diagram of components of one such smartphone WSD 102, although it can be assumed that the same or similar components are present in WSDs 104, 106. The WSD 102 comprises a controller 110, a display 112, hardware keys 114, RAM 118, memory 116, a headphone port 122, a speaker 120, a wireless communications module 124, an antenna 126 and a battery 128. The controller 110 is connected to each of the other components, except the battery 128, in order to control operation thereof.

The controller 110 can take any suitable form. For example, it may be a microcontroller, plural microcontrollers, a microprocessor, or plural microprocessors. The memory 116 may be non-volatile memory such as read only memory (ROM), a solid state drive (SSD) or a hard disk drive (HDD). The memory 116 stores, amongst other things, an operating system 132 and one or more software applications 130. The RAM 118 is used by the controller 110 for the temporary storage of data. The operating system 132 may contain code which, when executed by the controller 110, controls operation of the hardware components of the terminal.

The WSD 102, being a smartphone, is configured to engage in cellular communications. In addition, the WSD 102, is configured to communicate, by means of the wireless communications module 124 and antenna 126, using TVWS.

In order to communicate using TVWS, the WSD 102 first needs to select a channel from available channels. Once selected, data communications can take place over the selected channel. However, given the unlicensed nature of the TVWS it is likely that other WSDs, for example the second and third WSDs 104, 106 shown in FIG. 2, may be using the same channel. Co-operative adaptive selection is therefore performed with the aim of minimizing or at least reducing overall interference.

The remainder of this description is concerned with the adaptive channel selection method. Said method is in this case performed by software under processor control; the software is a software application 134 stored on the memory 116, or similarly firmware, a script or even hardware could be used. This software is hereafter referred to as the channel selection module 134.

The channel selection module 134 in overview selects a channel on the basis of a predetermined criterion, which in this case is least overall interference. Unlike known selection methods which tend only to be concerned with the interference that the requesting device is likely to experience on a channel (i.e. a "selfish" method) the present method also takes into account the interference that the WSD 102 will cause other WSDs 104, 106 by joining a channel they are using. Applicant has found that, by determining a so-called "altruistic" parameter, overall interference can be reduced or even minimized. The result is a co-operative selection protocol.

Figure 4:
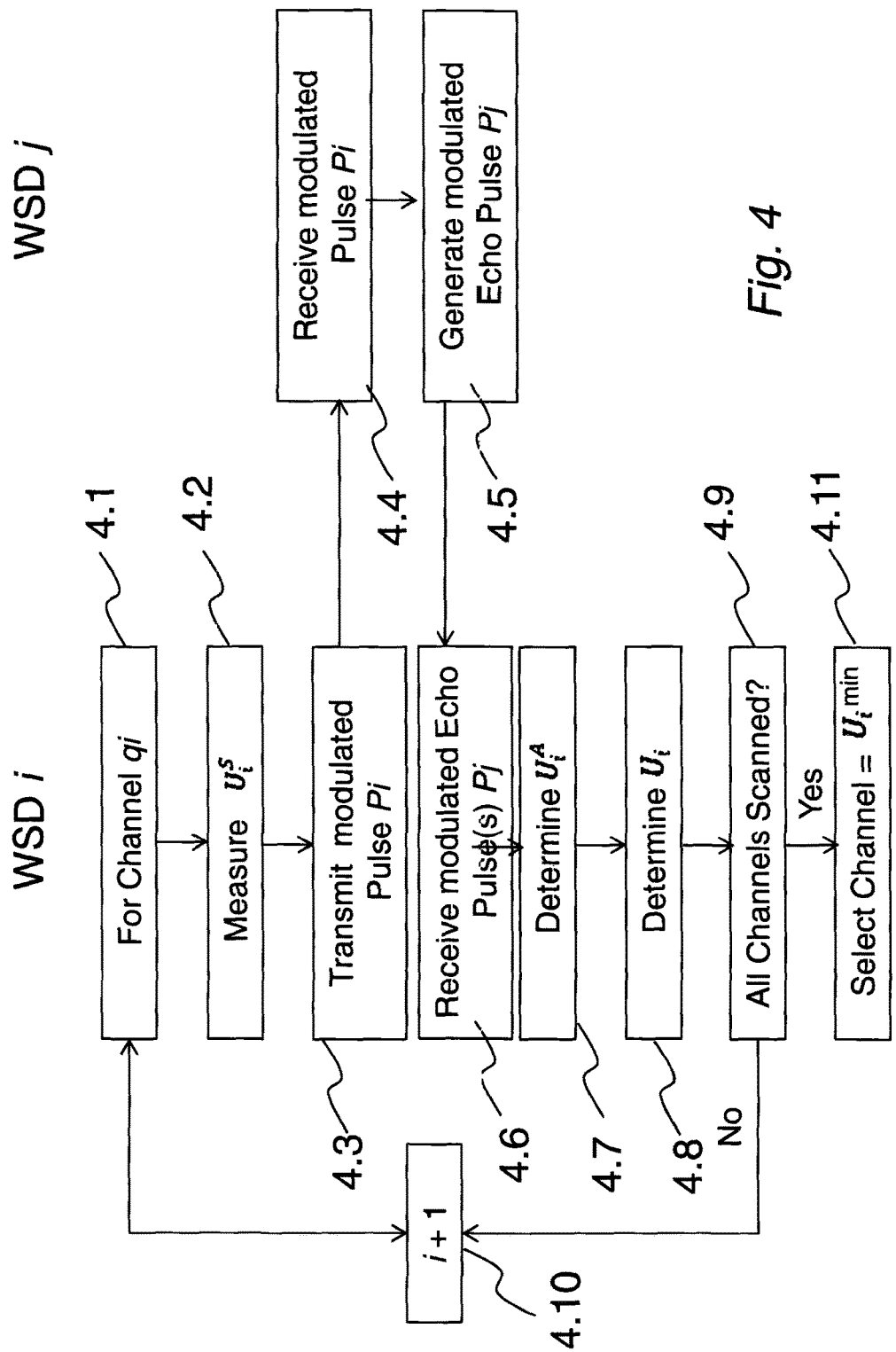
FIG. 4 is a flow diagram illustrating processing actions of a method for adaptive channel selection in accordance with an embodiment.

More specifically, referring to the flow chart of FIG. 4, the channel selection module performs the followings actions. The order of actions is merely indicative and it will be appreciated that certain actions can be interchanged or re-ordered.

For ease of explanation, we will assume that WSD 102 is the node seeking to select a channel.

At 4.1, one of the possible channels $q_i$ is analyzed.

At 4.2, for the current channel $q_i$, a selfish interference parameter $U_i^S$ is determined, this being indicative of the interference the WSD 102 is likely to experience due to the presence of other WSDs on the channel. 4.2 is conventional and is that which is performed in current WiFi adaptive channel selection methods, further information for which can be found in the referenced document in the background section. For each channel $q_i$, the WSD 102 tunes to that channel and the total energy or power is measured.

At 4.3, a pulse having power $P_i$ is transmitted over the current channel. The pulse is modulated.

At 4.4, the or each other WSD 104, 106 using the channel $q_i$ receives the transmitted pulse. At 4.5 the or each other WSD 104, 106 generates and transmits an echo pulse in reply, having power $P_j$. This echo pulse is also modulated.

At 4.6, the first WSD 102 receives the or each echo pulse $P_j$. At 4.7, an altruistic parameter $U_i^A$ is determined, indicative of the interference the WSD 102 is likely to cause other WSDs on the channel $q_i$. At 4.8, $U_i^S$ and $U_i^A$, are combined to determine a so-called utility function $U_i$.

At 4.9 and 4.10, if all channels have not yet been scanned, the method returns to 4.1 and repeats for the next channel $q_{i+1}$. If all channels have been scanned, then in 4.11 the channel for which the utility function $U_i$ is a minimum is selected.

$U_i^A$, cannot be determined by straightforward energy measurement. Rather, a so-called modulated echoing protocol is used to estimate the value of $U_i^A$ which will be described in greater detail below. In short, $U_i^A$ is determined based on analysis of the or each echo pulse.

Regarding 4.8, applicant has determined that the utility function $U_i$ can be advantageously expressed as a weighted sum of $U_i^S$ and $U_i^A$ as follows:

$$U_i = \alpha U_i^S + (1-\alpha) U_i^A \qquad (1)$$

where $\alpha$ is a weighting factor. Applicant has determined that overall system interference is minimized when $\alpha$ is, or is close to, 0.5.

Derivation of Utility Function $U_i$

For completeness, the derivation of expression (1) will now be explained.

Consider an area where N WSDs are deployed and a number of TVSW channels $q_1$, $q_2$, $q_3$, $q_m$ are available for selection. Mathematically, the average interference in the system can be written as:

$$I = \frac{1}{N} \sum_{i=1}^{N} \sum_{j \neq i}^{N} P_j G_{ji} \delta(q_i, q_j) \qquad (2)$$

where $p_j$ is the transmit power of another WSD node j, $G_{ij}$ is the communication channel from node j to node i and $\delta(q_i, q_j)$ is the channel overlap function. For non-overlapping channels this function is equal to 1 if $q_i = q_j$, and zero otherwise.

In the above, each device contributes to the average interference via two terms. The first term is the selfish interference parameter that i experiences when it uses a channel, e.g. $q_i$ for its transmission. This term is given by:

$$I_i^{\leftarrow} = \Sigma_{j \neq i}^N P_j G_{ij} \delta(q_i, q_j) \qquad (3)$$

The second term is the altruistic interference parameter that device i causes to other devices when it transmits in channel $q_i$. This term is given by:

$$I_i^{\rightarrow} = \Sigma_{j \neq i}^N P_j G_{ji} \delta(q_i, q_j) \qquad (4)$$

In heterogeneous networks we generally have $P_j \neq P_i$, because we could have both high and low power nodes, and also $G_{ij} \neq G_{ji}$, because some nodes may have directional antennas while others may use omnidirectional antennas. Therefore, generally, we have $I^{\rightarrow} \neq I^{\leftarrow}$.

Therefore, selection of a channel by a WSD device that minimizes the interference it experiences does not necessarily reduce the interference it causes other devices due to asymmetry in transmit power and communication channels. In particular, when a high power node chooses a channel that minimizes $I_i^{\leftarrow}$, this can result in an increase or decrease in $I^{\rightarrow}$. Assume that the optimal channel chosen by node i is $q_i^*$, then $$\text{Min}\{I_i^{\leftarrow}\} = \Sigma_{j \neq i}^N P_j G_{ij} \delta(q_i^*, q_j) \qquad (5)$$

In a homogenous network we have $G_{ij} = G_{ji}$ and $P_j = P_i$ and therefore:

$$\text{Min}\{I_i^{\rightarrow}\} = \text{Min}\{\Sigma_{j \neq i}^N P_i G_{ij} \delta(q_i^*, q_j)\} = \text{Min}\{\Sigma_{j \neq i}^N P_j G_{ji} \delta(q_i, q_j)\} = \Sigma_{j \neq i}^N P_j G_{ij} \delta(q_i^*, q_j) \qquad (6)$$

This means that a WSD can minimize the interference it experiences by choosing an optimal TVWS channel that also minimizes the interference it causes other WSDs. Therefore each can result in a reduction of the total interference.

To restore the interference minimization property of the algorithm, each WSD selects the channel that minimizes a weighted sum of the form:

$$U_i = \alpha \Sigma_{j \neq i}^N P_j G_{ji} \delta(q_i, q_j) + (1-\alpha) \Sigma_{j \neq i}^N P_i G_{ij} \delta(q_i, q_j) \qquad (7)$$

which is:

$$U_i = \alpha U_i^S + (1-\alpha) U_i^A \qquad \text{i.e. (1) above.}$$

Figure 7:
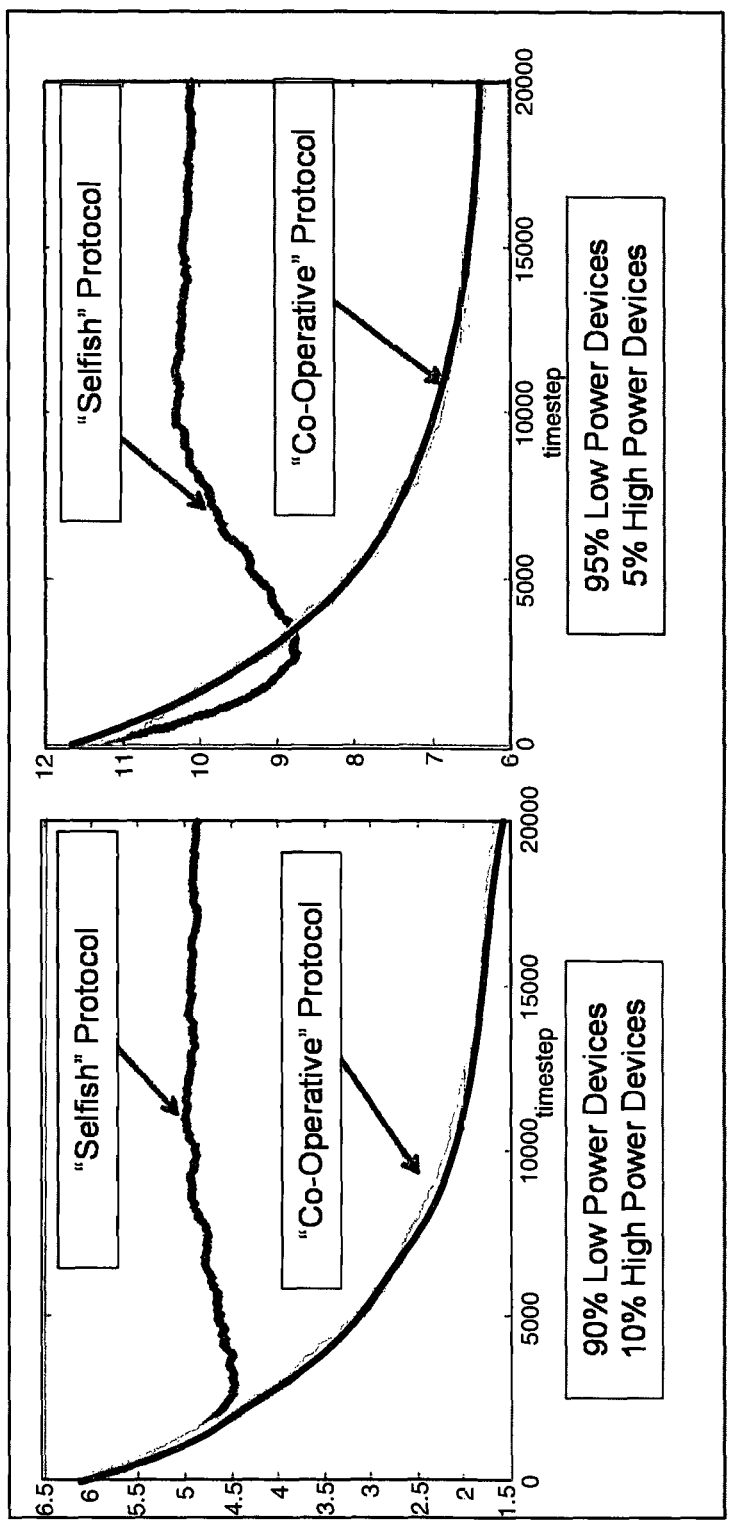
FIG. 7 is a series of graphs illustrating modelled interference results for the channel selection method of an embodiment.

The monotonic reduction of total system interference I that is found to result when $\alpha = 0.5$ is illustrated in FIG. 7 which shows output from computer-generated modelling, specifically where simulations using the above equations are compared with the result of minimizing $I_i^{\leftarrow}$ only, i.e. a selfish adaptive selection method.

Detailed Protocol

Figure 5:
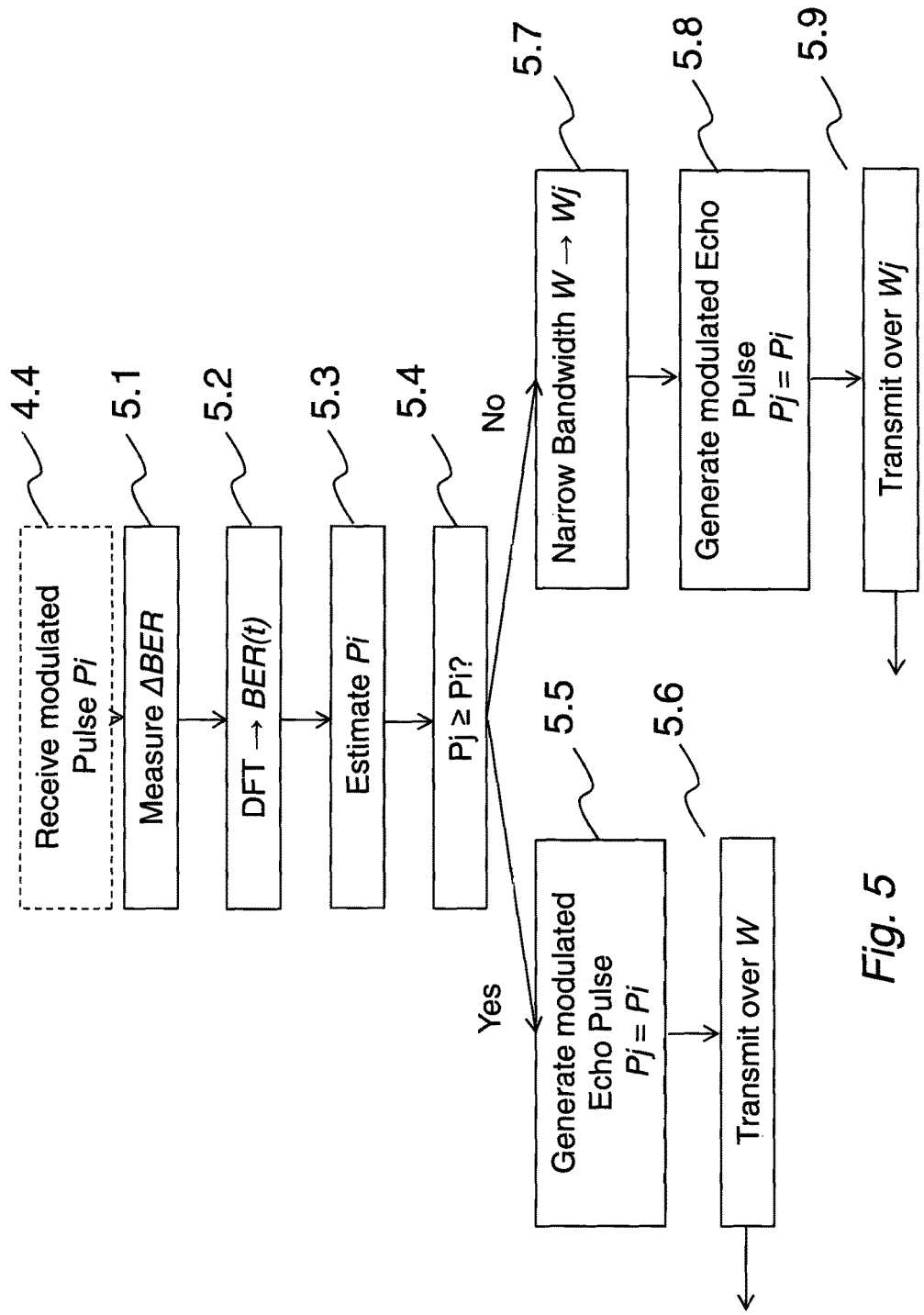
FIG. 5 is a flow diagram illustrating in more detail processing sub-actions performed as part of the FIG. 4 method.

A more detailed example of how the actions described in FIG. 4 may be used in practice will now be described with reference to FIGS. 4 and 5. FIG. 5 indicates in further detail sub-actions involved in generating the echo signal at one WSD, i.e. at 4.5.

For the purposes of illustration, we assume that the first WSD 102 seeks to communicate over TVWS and therefore, initially, must select a channel to use based on least interference.

Referring to FIG. 4, in 4.1 for a current channel $q_i = q_i$, $q_1$, $q_2$, $q_3$ ... $q_m$, the following is performed.

At WSD 102:
for 4.2, measure the total energy in the channel $q_i$ to obtain $U_i^S$. Note that this is conventional and is performed in current WiFi adaptive channel selection methods.
for 4.3, transmit a short burst or pulse of energy (interference) in channel $q_i$, using maximum transmit power $P_i$.

In one embodiment, the energy burst is modulated with a periodic function $\varphi(f)$, for example a sinusoidal, which has a frequency $\omega_i = g(P_i)$, where g is a one-to-one mapping from $P_i$ to $\omega_i$. The mapping could be expressed as an analytical formula, or located in a look-up-table. The example used in this embodiment is $\varphi(f) = e^{(f-q_i)^2} \sin(\omega_i f)$, with $$\omega_i = \omega_o \frac{p_i}{1+p_i},$$

where $\omega_i$ is a scaling factor, which is a protocol parameter.

This short burst of energy will be experienced by other WSDs in the vicinity of WSD 102 which is or are using channel $q_i$ for transmission, notably as an instantaneous increase in average interference in this channel. For illustration, let us assume that second WSD 104 is using the current channel $q_i$. When receiving data, WSD 104 will experience an increase in its Signal to Interference plus Noise Ratio (SINR) on channel $q_i$, given by:

$$SINR = \frac{S}{N+\bar{I}+\Delta I} \quad \text{where } \Delta I = p_i G_{ij} \qquad (8)$$

This increase in the SINR will result in an increase in the bit-error rate (BER) at WSD 104(j). Using a linear approximation the increase in BER is given by:

$$\Delta BER(t) = BER'(\bar{I})\Delta I(t) = BER'(\bar{I})p_i G_{ij}\varphi(f) \qquad (9)$$

Where BER' is the derivative of BER with respect to SINR, taken when $\Delta I=0$. BER' depends on the digital modulation used by WSD 104, but is generally a well-known function (either analytically or via tabulation) for any digital modulation.

Referring now to FIG. 5, at WSD 104:
At 5.1 measure the change $\Delta BER(t)$ in the average BER to estimate the amplitude $p_i G_{ij}$ from Equation (9);
At 5.2, perform a Discrete Fourier Transform (DFT) on BER(t) to determine the frequency $\omega_i$ from which can be estimated in step 5.3 the power of WSD 102 $P_i$ using the inverse mapping referred to above, i.e. $P_i = \varphi^{-1}(\omega_i)$.
Next, at 5.4, WSD 104 identifies which of two possible situations occurs.
If the maximum transmit power $P_j$ of WSD 104 is equal to, or greater than, the estimated power $P_i$ of WSD 102 then at 5.5, transmit over the channel $q_i$ a constant energy burst at transmit power $P_i$ as estimated; or
If the maximum transmit power $P_j$ of WSD 104 is less than the estimated power $P_i$ of WSD 102 then, because of the transmit power limitation, at 5.7 to 5.9 generate and transmit a burst of energy at transmit power $P_j$ using a narrower bandwidth $W_j$ than the full bandwidth W of the current channel. This burst of energy is also modulated by frequency $\omega_j = \varphi(P_j)$.
At 5.7, WSD 104 reduces its bandwidth from W to $W_j = \alpha_{ij} W$, where the discount or narrowing factor $\alpha_{ij}$ is given by $$\alpha_{ij} = \frac{P_j}{P_i}. \qquad (10)$$

Figure 6:
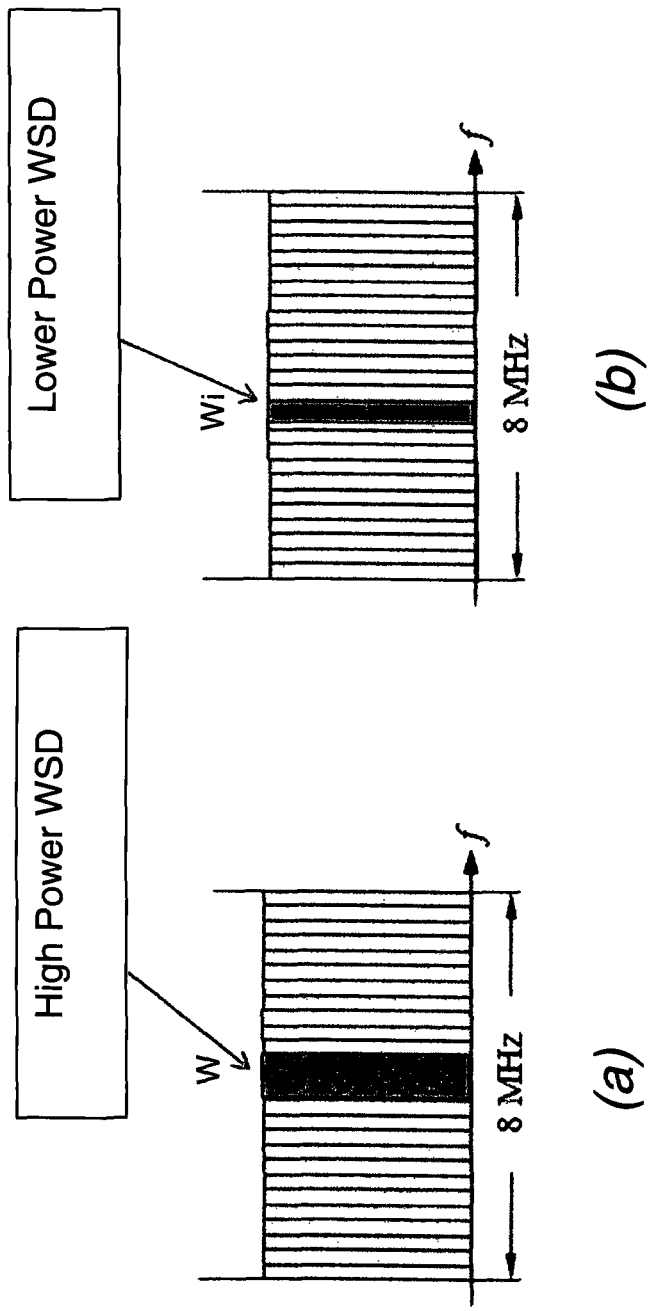
FIGS. 6a and 6b are graphs respectively showing transmit powers for first and second nodes performing the method described with reference to FIGS. 4 and 5.

FIGS. 6a and 6b illustrate the transmitted pulses from WSD 102 and WSD 104, respectively. Note that FIG. 6b shows the case where the maximum transmit power $P_j$ of WSD 104 is less than the estimated power $P_i$ of WSD 102, hence the use of narrower bandwidth $W_j$.

At WSD 102:
WSD 102 collects the energy received from WSD 104 (and other WSDs using the same channel) within bandwidth W, centered at frequency $q_i$. It performs a discrete FFT on the received energy, from which it obtain the modulation frequency of received echo(s) $\omega_j$. It computes the transmit powers, $P_j = \varphi^{-1}(\omega_j)$ and the discount factors $$\alpha_{ij} = \frac{P_j}{P_i}.$$

WSD 102 (i) then computes an estimate for the altruistic parameter $U_i^A$, using the equation:

$$U_i^A = \Sigma_{j \neq i}{}^N P_i G_{ji} \delta(q_i, q_j) \approx \Sigma_{j \neq i}{}^N \alpha_{ij}{}^{-1} E_j \qquad (11)$$

where $E_j$ is the energy component corresponding to frequency $\omega_j$. This corresponds to 4.7 in FIG. 4.
An estimate of the utility function $\hat{U}_\iota$ for the channel is obtained at 4.8 thus:

$$\hat{U}_\iota = \alpha \Sigma_{j \neq i}{}^N P_j G_{ji} \delta(q_i, q_j) + (1-\alpha) \Sigma_{j \neq i}{}^N \hat{I}^{\rightarrow}(q_i) \delta(q_i, q_j) \qquad (12)$$

At 4.11, when estimates for $\hat{U}_\iota$ have been obtained for all channels $q_i \ldots q_N$, the one having the minimum value is selected, i.e. $q_i^{min}$.
If $q_i^{min}$ is different from the currently-used channel, WSD 102 switches to the new channel, and bi-directional communications using the TVWS can take place.

The above-described actions can be performed periodically by each WSD 102, 104, 106 and indeed by all other WSDs (not shown) within the network 100 to ensure appropriate distribution of frequencies to avoid interference issues.

It will be appreciated that information indicative of the received powers of the echo request pulse and each echo pulse made in reply is encoded in the modulation frequencies of the respective pulses as transmitted.

Although the use of TVWS databases is not required, if some form of localized or centralized database is provided, the database can be updated periodically to reflect channel allocations using the above method actions.

In summary, there is described a method and system for adaptive channel selection in a wireless network, for example a TVWS network. The method can provide an overall protocol with each WSD performing appropriate ones of the method actions. The method enables channel selection to be made autonomously without the need for a centralized database, and because it works on the physical layer, can be employed by heterogeneous devices not using the same air-interface, devices having different transmit powers and/or having different antenna types.

An example application is in the use of WSDs for wireless broadband in rural areas. Another is in providing connectivity for machine to machine (M2M) applications and in enhancing broadband access in the home. The first two applications are likely to involve high power WSDs (base stations or access points) for communicating with customer equipment with directional antennas. The third application will likely use low power WSDs.

With multiple service providers likely to make use of TVWS there is the need to protect each provider's WSDs and services against interference from other service providers WSDs.

Additional Implementation Details

The systems and methods of the above embodiments may be implemented in a computer system (in particular in computer hardware or in computer software or a combination of both) in addition or as an alternative to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Alternatively, a microprocessor, plural microprocessors, microcontroller, plural microcontrollers, ASIC and/or FPGA may be employed. The computer system may have a monitor to provide a visual output display. The data storage may comprise RAM, hard disk drive (HDD) or other computer readable media, including portable media and optical media. The computer system may include a plurality of computing devices connected by a network and able to communicate with each other over that network.

The methods of the above embodiments may be provided as computer programs or as computer program products or computer-readable media carrying a computer program which is arranged, when run/executed on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method of channel selection in a wireless network, the method being performed at a first communications node i and comprising:
   (a) identifying a plurality of communications channels $q_n$ and, for each channel:
      (i) determining a first interference measure $U_i^S$ for the channel based on received energy or power from at least one other node j using said channel;
      (ii) transmitting from the first communications node i a modulated pulse of power $P_i$ effective to cause the at least one other node j using said channel to issue at least one modulated echo pulse of power $P_j$ in reply;
      (iii) causing the at least one other node j using said channel to transmit at least one echo signal in response to the transmitted modulated pulse of power $P_i$, and receiving the at least one echo signal at the first communications node i;
      (iv) determining from the at least one echo signal a second interference measure $U_i^A$ representative of interference that the first communications node i will cause on the at least one other node j; and
      (v) determining a third interference measure $U_i$ based on a combination of the first and second interference measures; and
   (b) selecting a channel whose third interference measure meets a predetermined condition.

2. A method according to claim 1, wherein (b) comprises selecting the channel whose third interference measure $U_i$ is the lowest.

3. A method according to claim 1, wherein (a)(v) comprises determining $U_i$ using a weighted sum of the first and second interference measures $U_i^S$, $U_i^A$.

4. A method according to claim 3, wherein (a)(v) comprises determining $U_i$ using: $\alpha U_i^S + (1-\alpha)U_i^A$ where $\alpha$ is a weighting factor.

5. A method according to claim 1, wherein (a)(i) comprises determining $U_i^S$ by measuring the total energy or power received in the channel from the at least one other node.

6. A method according to claim 1, wherein (a)(iv) comprises determining the second interference measure $U_i^A$ using a summation of the characteristic of a received at least one echo pulse of power $P_j$.

7. A method according to claim 6, wherein (a)(iv) comprises estimating the power $P_j$ of the received at least one echo pulse of power $P_j$ and using said characteristic to calculate the second interference measure $U_i^A$.

8. A method according to claim 7, wherein (a)(iv) comprises estimating the modulation frequency $\omega_j$ of the received at least one echo pulse of power $P_j$ and using said estimate to estimate the at least one echo pulse of power $P_j$.

9. A method according to claim 7, wherein (a)(iv) comprises calculating a discount factor $\alpha_{ij}$ for the received at least one echo pulse of power $P_j$, where $\alpha_{ij}$ is the ratio of $P_j$ to $P_i$, and determining the second interference measure $U_i^A$ using $$\sum_{j \neq i}^{N} \alpha_{ij}^{-1} E_j$$

where $E_j$ is an energy component corresponding to $\omega_j$ of the at least one received echo pulse of power $P_j$.

10. A method according to claim 1, further comprising:
   (c) receiving an echo request signal from another node j;
   (d) responsive to said receipt, transmitting back to node j an echo signal,
   wherein (d) comprises estimating the power of the echo request signal from node j and generating an echo signal in reply having a characteristic that is dependent on said estimated power of the echo request signal.

11. A method according to claim 10, wherein (d) further comprises estimating the power of the echo request signal by estimating an increase in Bit Error Rate (BER) caused by receiving the echo request signal, and using the increase in BER to estimate the power of the echo request signal.

12. A method according to claim 11, wherein the increase in BER is used to compute an estimate of the amplitude of the echo request signal from which is derived the estimated power of the echo request signal.

13. A method according to claim 10, wherein if the estimated power of the echo request signal is less than that that can be issued by first communications node i for the echo signal for the channel bandwidth, then the echo signal is transmitted back at substantially the same power of the echo request signal by means of using a narrower bandwidth, wherein the narrower bandwidth is determined by reducing the channel bandwidth by a factor substantially equal to the ratio of the power that can be issued by the first communications node i for the channel bandwidth and the estimated power of the echo request signal.

14. A non-transitory computer-readable storage medium having stored thereon computer readable code, which, when executed by a computing apparatus, causes the computing apparatus to perform the method according to claim 1.

15. A communication node i forming part of a system of communication nodes, comprising:
- a channel identifier configured to identify a plurality of communications channels $q_n$ and, for each channel, arranged to:
  - (i) determine a first interference measure $U_i^S$ for the channel based on received energy or power from at least one other node j using said channel;
  - (ii) transmit a modulated pulse of power $P_i$ effective to cause the at least one other node j using said channel to issue at least one modulated echo pulse of power $P_j$ in reply;
  - (iii) receive at least one echo signal from a respective one of the at least one other node j using said channel;
  - (iv) determine from the at least one echo signal a second interference measure $U_i^A$ representative of interference that the communication node i will cause on the at least one other node j;
  - (v) determine a third interference measure $U_i$ based on a combination of the first and second interference measures; and
- a channel selector configured to select a channel whose third interference measure meets a predetermined condition.

16. A communication system comprising a plurality of communication nodes according to claim 15.

* * * * *